United States Patent
MacGillivray et al.

(10) Patent No.: US 11,755,672 B2
(45) Date of Patent: Sep. 12, 2023

(54) SEARCH RESULT FILTERS FROM RESOURCE CONTENT

(71) Applicant: Google LLC, Mountain View, CA (US)

(72) Inventors: Ian MacGillivray, Brooklyn, NY (US);
Kaylin Spitz, Brooklyn, NY (US);
Selena Sunling Yang, New York, NY (US); Varun Jasjit Singh, Brooklyn, NY (US); Emma S. Persky, New York, NY (US); Yonatan Erez, Yehud (IL)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/850,655

(22) Filed: Jun. 27, 2022

(65) Prior Publication Data

US 2022/0327175 A1 Oct. 13, 2022

Related U.S. Application Data

(63) Continuation of application No. 16/265,714, filed on Feb. 1, 2019, now Pat. No. 11,372,941, which is a
(Continued)

(51) Int. Cl.
*G06F 7/00* (2006.01)
*G06F 16/9535* (2019.01)
*G06F 16/332* (2019.01)

(52) U.S. Cl.
CPC ...... *G06F 16/9535* (2019.01); *G06F 16/3322* (2019.01)

(58) Field of Classification Search
None
See application file for complete search history.

(56) References Cited

U.S. PATENT DOCUMENTS 8,280,900 B2 10/2012 Pickens et al.
8,589,399 B1 * 11/2013 Lee .................. G06F 16/313
707/737

(Continued)

FOREIGN PATENT DOCUMENTS

| CN | 103150409 | 6/2013 |
| CN | 103294815 | 9/2013 |

(Continued)

OTHER PUBLICATIONS

China National Intellectual Property Administration; Decision of Rejection issued for Application No. 201680028668.4, 5 pages, dated Jun. 2, 2022.

(Continued)

*Primary Examiner* — Tuankhanh D Phan
(74) *Attorney, Agent, or Firm* — Gray Ice Higdon

(57) ABSTRACT

Methods, systems, and apparatus, including computer programs encoded on a computer storage medium, for providing filters from resource content. In one aspect, a system receives data identifying a set of resources that are determined to be responsive to a search query and extracts a set of keywords from the contents of the resources and related queries. The keywords are processed according to candidate selection criteria, and a set of candidate query filters are determined. The candidate filters may be used to filter the resources that are responsive to the query.

20 Claims, 5 Drawing Sheets

Related U.S. Application Data continuation of application No. 15/183,455, filed on Jun. 15, 2016, now Pat. No. 10,242,112.

(60) Provisional application No. 62/192,713, filed on Jul. 15, 2015.

(56) References Cited

U.S. PATENT DOCUMENTS

| | | |
|---|---|---|
| 8,930,356 B2 | 1/2015 | Kawale et al. |
| 10,242,112 B2 | 3/2019 | MacGillivray et al. |
| 2002/0194166 A1 | 12/2002 | Fowler |
| 2009/0024467 A1 | 1/2009 | Fontoura et al. |
| 2009/0259646 A1 | 10/2009 | Fujita et al. |
| 2010/0114928 A1 | 5/2010 | Bonchi et al. |
| 2010/0306249 A1 | 12/2010 | Hill et al. |
| 2011/0179021 A1 | 7/2011 | Wen et al. |
| 2012/0317141 A1 | 12/2012 | Qiao |
| 2013/0159348 A1 | 6/2013 | Mills et al. |
| 2013/0238587 A1 | 9/2013 | Annau et al. |
| 2013/0268517 A1 | 10/2013 | Madhavan et al. |
| 2014/0330813 A1 | 11/2014 | Lee et al. |
| 2015/0026155 A1 | 1/2015 | Martin |
| 2015/0081656 A1 | 3/2015 | Wang et al. |
| 2016/0012052 A1 | 1/2016 | Zoryn et al. |
| 2019/0163713 A1 | 5/2019 | MacGillivray et al. |

FOREIGN PATENT DOCUMENTS

| | | |
|---|---|---|
| CN | 103544190 | 1/2014 |
| CN | 103577595 | 2/2014 |
| CN | 104090963 | 10/2014 |
| RU | 2487404 | 7/2013 |
| RU | 2542936 | 2/2015 |

OTHER PUBLICATIONS

China National Intellectual Property Administration; Notification of First Office Action issued in Application No. 201680028668.4; 19 pages; dated Apr. 22, 2021.

China National Intellectual Property Administration; Notification of Second Office Action issued in Application No. 201680028668.4; 13 pages; dated Dec. 29, 2021.

IN Office Action in Indian Application No. 201847004382; 6 pages; dated Sep. 25, 2020.

EP Office Action in European Application No. 16825180.9; 9 pages; dated Aug. 7, 2020.

EP Office Action in European Application No. 16825180; 8 pages; dated Feb. 4, 2020.

RU Office Action issued in Russian Application No. 2017137752/08(065914); 10 pages; dated Dec. 6, 2018.

International Search Report and Written Opinion in Application No. PCT/US2016/042289, 12 pages; dated Oct. 3, 2016.

EP Extended European Search Report issued in European Application No. 16825180.9, 8 pages; dated Sep. 19, 2018.

\* cited by examiner

SEARCH RESULT FILTERS FROM RESOURCE CONTENT

BACKGROUND

The Internet provides access to a wide variety of resources, for example, video files, image files, audio files, or Web pages, including content for particular subjects, book articles, or news articles. A search system can select one or more resources in response to receiving a search query. A search query is data that a user submits to a search engine to satisfy the user's informational needs. The search queries are usually in the form of text, e.g., one or more query terms. The search system selects and scores resources based on their relevance to the search query and on their importance relative to other resources to provide search results that link to the selected resources. The search results are typically ordered according to the scores and presented according to this order.

A search query, however, is often an incomplete expression of a user's informational need. Thus, a user may often refine a search query after reviewing search results, or may select a "suggested query" that is provided by a search engine to conduct another search. A user may also attempt to filter within a set of search results. However, the user may need to generate a filter term or operation, or rely on "hardcoded" filters that require expert knowledge and programming ahead of time, together with manual internationalization, in order to be effective. Furthermore, given the dynamic nature of the corpus of resources available over the Internet, new filtering terms may be emergent and escape the notice of both the user and resource curators.

SUMMARY

This specification describes technologies relating to search engines. In general, a user can request information by inputting a query to a search engine. The search engine can process the query and can provide information including query filters for output to the user in response to the query. The queries are dynamically determined, in part, from the content of the resources that are responsive to the query.

In general, one innovative aspect of the subject matter described in this specification can be embodied in methods that include the actions of receiving, for a first query, data identifying a set of resources that are determined to be responsive to the first query; extracting, from the set of resources, a first set of keywords from the contents of the resources; determining, from the first set of keywords, a set of candidate filters from the keywords, each candidate filter derived from one or more keywords in the set of keywords, and wherein the set of candidate filters are a proper subset of the first set of keywords; determining, from the set of candidate filters, a set of query filters, each query filter in the set of query filters meeting a diversity threshold that is indicative of a filtered set of content resulting from applying the query filter to the set of resources and a filtered set of content resulting from applying another query filter to the set of resources meeting a difference threshold; and providing, in response to the first query, for display on a user device and with content results that identify content in the set of resources, the set of query filters for the first query. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Search query filters can be automatically learned offline and/or generated at serving time, improving the search engine system performance and saving users a large degree of human effort. Generally, the filters can be learned from any relevant metadata or text. For example, in the context of an application that is used to provide reviews for certain businesses, e.g., restaurants, learned filters from item reviews and descriptions may be used to narrow a user's search query and lead a user closer towards their end goal. Furthermore, learned filters from item reviews and descriptions enables presented filters to be more tailored to both the specific user need at the time, and the available results to be filtered. Learning filters from item reviews and descriptions enable a search engine system to provide search results in specific domains which vary not just with the categorical query but also with the results available at the time of the search.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A search engine system provides user-selectable search query result filters for display on a user device in response to a user-input search query. The system receives data identifying a set of resources that are determined to be responsive to the search query and extracts a set of keywords from the contents of the resources. The keywords are processed according to candidate selection criteria, and a set of candidate query filters are determined. The set of candidate query filters is trimmed using diversity criteria, ensuring that remaining candidate query filters have a reasonable degree of diversity in the sets of search query results that they represent. For example, in some implementations, pairs of candidate query filters are grouped into a single candidate filter if the filtered sets of search query results resulting from applying both candidate query filters are substantially similar. The diversified set of candidate query filters are provided for display on the user device in response to the search query, together with search query results.

These features and additional features are described in more detail below. In the examples provided below, the features are described in the context of a general search engine. However, the features can be applied to any system or application that searches a data store. For example, the features described below can be applied to an application that searches a corpus specific to the application. An example of the latter is a mobile phone application that is used to search, provide reviews for, and make reservations at restaurants; or alternatively can be applied to search a large web corpus.

Example Operating Environment

Figure 1:
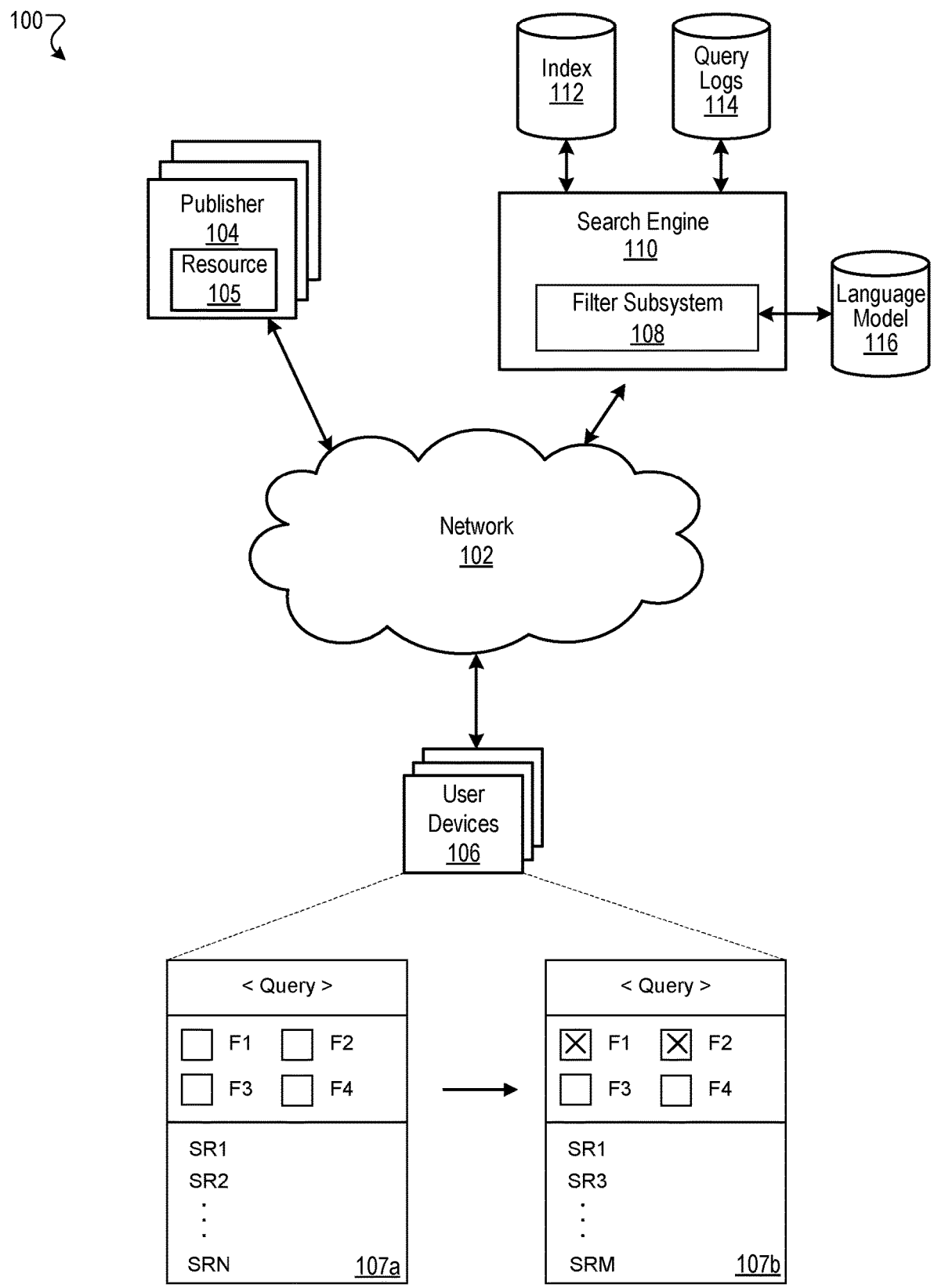
FIG. 1 is a block diagram of an example environment in which filters from item reviews and descriptions are provided.

FIG. 1 is a block diagram of an example environment 100 in which filters from item reviews and descriptions are provided. A computer network 102, such as a local area network (LAN), wide area network (WAN), the Internet, or a combination thereof, connects publisher web sites 104, user devices 106, and the search engine 110. The online environment 100 may include many thousands of publisher web sites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each website 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, image files, video files, audio files, and feed sources, to name just a few. The resources may include embedded information, e.g., meta information and hyperlinks, and/or embedded instructions, e.g., client-side scripts.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 identifies the resources by crawling the publisher web sites 104 and indexing the resources provided by the publisher web sites 104. The resources are indexed and the index data are stored in an index 112.

The user devices 106 submit search queries to the search engine 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results and returns the search results to the user devices 106 in a search results page resource. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

In addition, in response to the search request, the filter subsystem 108 identifies search query filters that are relevant for the identified resources. The filter subsystem 108 identifies the search query filters in the form of search query filter results and returns the search query filter results to the user devices 106 in the search results page resource. A search query filter result is data generated by the filter subsystem 108 that can be used to filter the search results that satisfy the search query to a set of filtered search results that satisfies the search query and the selected filter.

The user devices 106 receive the search results pages, including the search query filter results, and render the pages for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

In response to the user selecting a search query filter at a user device 106, the user device 106 requests a set of filtered search results identified by the resource locators included in the selected search query filter. The search engine system 110 receives the request for the subset of search results from the user device 106 and provides the subset of search results to the requesting user device 106. For example, in FIG. 1, a set of search results {SR1 . . . SRN} are shown in the search results page 107a, along with a set of filters {F1 . . . F4}. However, in the search results page 107b, the filters F1 and F2 are selected by the user on the user device, resulting in the filtered set of search results {SR1, SR3, . . . SRM}. The filtered set of search results {SR1, SR3, . . . SRM} are a proper subset of the search results {SR1 . . . SRN}.

In some implementations, the queries submitted from user devices are stored in query logs 114. The query logs 114 define search history data that include data from and related to previous search requests associated with unique identifiers. The query logs 114 can be used to map queries submitted by user devices to resources that were identified in search results and the actions taken by users when presented with the search results in response to the queries. In some implementations, data are associated with the identifiers from the search requests so that a search history for each identifier can be accessed. The query logs 114 can also include selection data that can be used by the search engine to determine the respective sequences of queries submitted by the user devices, the actions taken in response to the queries, and how often the queries have been submitted. Likewise, the selection data can also be used to determine for each particular resource the queries for which users find the resource to be most useful.

Generating Filters from Resource Content

Figure 2:
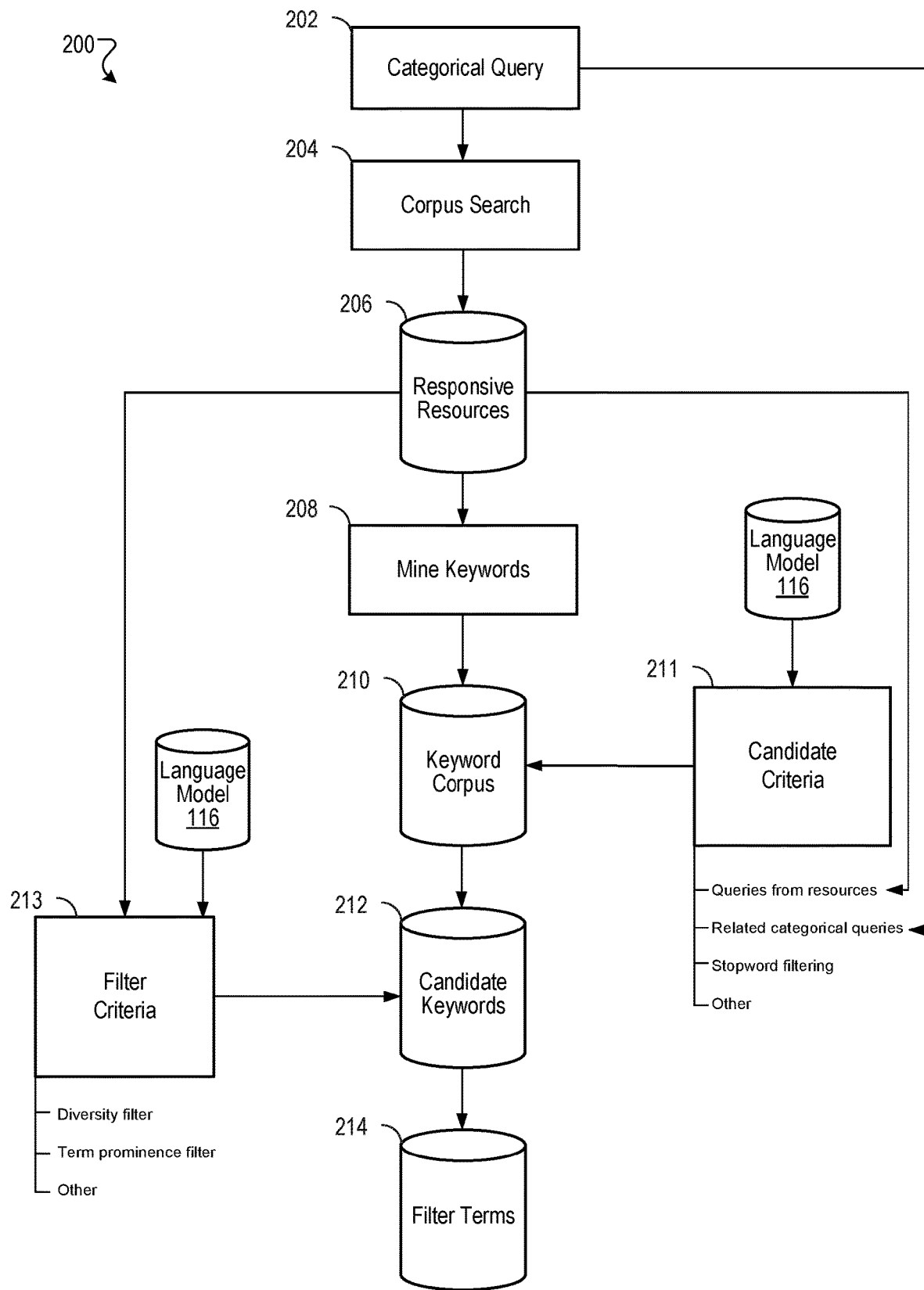
FIG. 2 is a block diagram of an example process for generating query filters.

Operation of the system 100 is described with reference to FIG. 2 below, which is a block diagram 200 of an example process for generating query filters. For example, the process 200 can be performed by the system 100 in response to receiving a search query input by a user. The process 200 can be implemented, for example, in a data processing apparatus that is used to realize the filter subsystem 108.

The system receives a search query input by a user at a user device, such as the user device 106 of FIG. 1 (202). The search query may include one or more terms, e.g., words, numbers or symbols. In some implementations the process is invoked only when the search query is a categorical query, i.e. a query for which search results are highly indicative of a particular category, e.g., food, entertainment, etc. For example, the query "burgers" may be a categorical query related to one or more of the categories of "dining," "food," and "restaurants," for example. Categorical queries may be predefined by the search engine 110, or may be identified at query time based on, for example, a dominant intent derived from the content of responsive resources.

The system performs a corpus search in order to determine a set of resources that are responsive to the received search query (204). The corpus may be a collection of available resources and text found at a number of publisher websites, for example the publisher websites 104 and resources 105 of FIG. 1.

The system identifies responsive resources (206). The responsive resources are those resources determined to be responsive to the received search query by at least a threshold measure, e.g., the top 1,000 ranked resources. For example, in response to receiving the search query "burgers," the identified set of responsive resources may include restaurant menus, restaurant reviews and descriptions.

The system mines the responsive resources corpus to determine an associated set of keywords (208). Each keyword may include one or more words, numbers or symbols. For example, upon receiving the search query "burgers," the associated set of keywords mined from the responsive set of resources may include several thousands of nearby food items available on food menus. In some implementations, the reviews, descriptions and other metadata can be mined to find the most frequently used keywords in the corpus of responsive resources.

The system generates a keyword corpus from the mining (210). The keyword corpus includes keywords, for example, the most frequently used keywords in the responsive resources 206, such as keywords that meet a frequency threshold relative to the frequencies of other keywords in the responsive resources.

The keyword corpus can be filtered to generate a set of candidate keywords according to candidate criteria (211). Candidate criteria can include queries to which the resources 206 are responsive. For example, for the resources responsive to the query "burgers," the query logs 114 are processed by the filter subsystem 108 to identify other queries to which one or more resources are selected at least a threshold rate. In the example above, for the query "burger," the resources, based on the query log 114, may be responsive to the other queries "guac burgers," "barbeque burger restaurants," etc. Likewise, queries that are determined to be related to the query "burgers" can also be used. In yet further examples, the candidate criteria 211 may include additional keywords corresponding to categorical search queries related to the search query input by the user 202.

The use of a language model 116, for example, may facilitate query-similarity findings. Similarities may be based on stemming, synonyms, and even behavioral indicators, such as similar click patterns for different terms. For example, the term "guac" may be determined to be similar to "California style" in the context of restaurants.

The filtering system 108 can also implement stop word filtering in order to remove keywords which are not useful or related to the search query received by the user and/or the queries from the resources.

The keywords of these queries are compared to the keywords in the corpus 210 to determine which keywords should be discarded. For example, the corpus may include the term "heart healthy." However, this keyword may not be in queries, or may be in the queries but at a very low frequency relative to other keywords. Accordingly, the term "heart healthy" will not be selected as a candidate keyword.

The system generates a candidate keyword corpus (212). The candidate keyword corpus includes the set of keywords generated according to the candidate criteria 211. The candidate keyword corpus can be filtered to generate a set of filter terms according to filter criteria (213). For example, the candidate keyword corpus may implement a diversity filter to the candidate keywords. The diversity filter enables the system to determine filter terms that have a high degree of diversity in the sets of search results that they represent. In other examples, the candidate keyword corpus may implement a term-prominence filter in order to filter out and remove candidate keywords that only appear in metadata, or in inconspicuous locations in the corresponding responsive resource 206.

The system generates a filter term corpus using the filtered candidate keyword corpus (214). The filter terms in the filter term corpus may be provided to a user device. The filter terms may be shown on the user device in some user interface or interactive format, and used to narrow a search query in order to lead a user closer towards their end goal.

Figure 3:
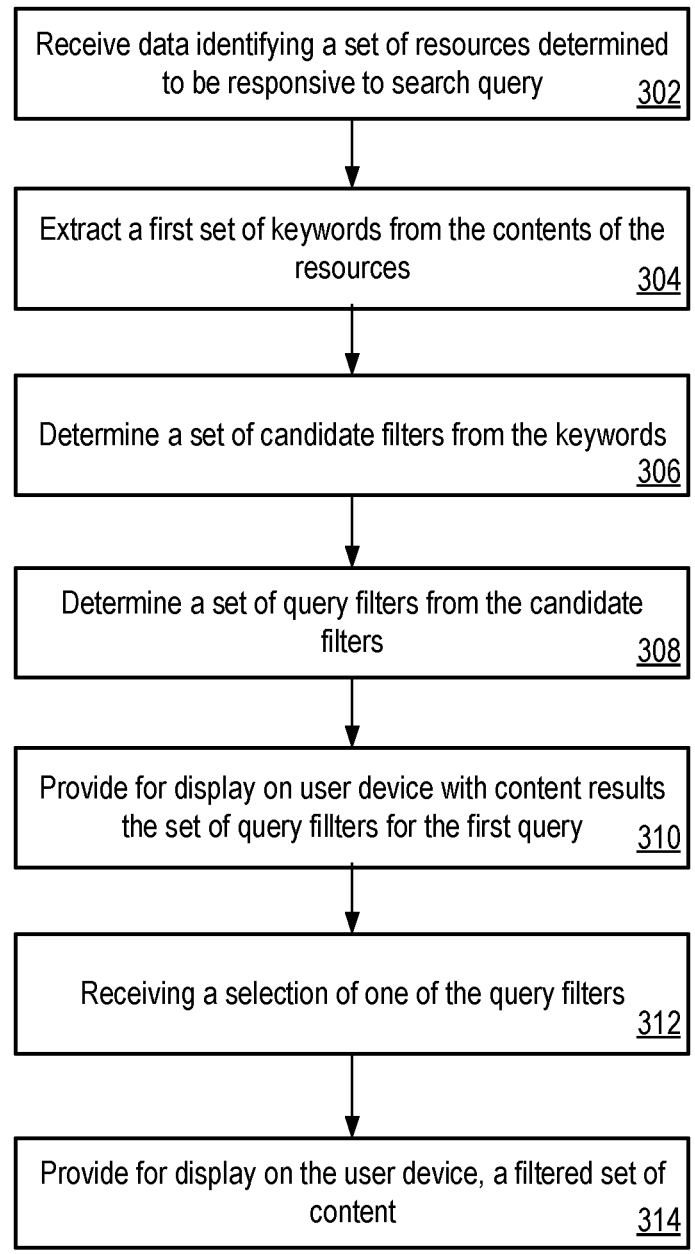
FIG. 3 is a flow diagram of an example process for providing query filters.

FIG. 3 is a flow diagram 300 of another example process for providing query filters. The process 300 can be implemented in a data processing apparatus that is used to realize the filter system 108.

The filter subsystem 108 receives data identifying a set of resources that are determined to be responsive to a search query (302). In some implementations, the search query may be a categorical query. The set of resources can include HTML pages, electronic documents, image files, video files, audio files, and feed sources which may include embedded information, e.g., meta information and hyperlinks. For example, a user may have input the query "burgers" and the filter subsystem 108 may in turn receive data identifying a set of HTML pages or electronic documents including reviews, descriptions and other meta information pertaining to nearby food items available on food menus.

The filter subsystem 108 extracts a first set of keywords from the contents of the set of resources (304). A keyword can include one or more words, symbols or numbers that are associated with the search query. For example, the first set of keywords may include a set of words, symbols or numbers that occur most often in the contents of the set of resources that are determined to be responsive to the search query.

The filter subsystem 108 determines a set of candidate filters from the first set of keywords (306). Each candidate filter is derived from one or more of the keywords in the first set of keywords. The set of candidate keywords are a proper subset of the first set of keywords.

For example, in some implementations, the filter subsystem 108 may determine a set of candidate filters from the first set of keywords by determining a set of queries from the resources in the set of resources, where each query in the set of queries is a query for which at least one of the resources has been selected by a user. For example, a top-ranked resource may be highly relevant to the queries "guac burgers" and "whiskey barbeque burgers." Thus, the queries "guac burgers" and "whiskey barbeque burgers" may be used as candidate selection criteria.

In other implementations, the filter subsystem may determine a set of candidate filters from the first set of keywords by determining a set of queries from the first query where each query in the set of queries is a query that is determined to be related to the first query. For example, a user may have input the search query "burgers," and the filter subsystem 108 may determine that the search query "hotdogs" is related to the search query "burgers" and include the search query "hotdogs" in the set of candidate selection criteria. Processing related queries to identify candidate filters is described in more detail with reference to FIG. 4 below.

The candidate filters are determined by removing, from the first set of keywords, keywords that are determined to not be relevant to the candidate set of queries from the resources and/or queries related to the received query. The keywords may be determined to be relevant to the query keywords based on an exact match, or based on meeting a similarity threshold to the query terms. For example, a keyword "guacamole" will be relevant to the query keyword "guac," as the two keywords are determined to be similar. Again, as described above, the use of a language model 116 may facilitate query-similarity findings based on stemming, synonyms, behavioral indicators, and other semantic and/or behavioral data that indicate a similarity of terms or concepts.

The filter subsystem 108 determines a set of query filters from the set of candidate filters (308). In some implementations, each query filter in the set of query filters meets a diversity threshold that is indicative of a filtered set of content resulting from applying a query filter to the set of resources and a filtered set of content resulting from applying another query filter to the set of resources meeting a difference threshold. For example, the set of candidate filters may include the keywords "guacamole" and "guac." The system may determine that the set of content resulting from applying the query filter "guacamole" to the set of resources for the search query "burgers" may be similar, if not identical, to the set of content resulting from applying the query filter "guac" to the set of resources for the search query "burgers." Upon determining that the filtered sets of content resulting from applying the query filters "guacamole" and "guac" do not meet a difference threshold, the set of query filters will not include both query filters "guacamole" and "guac."

The filter subsystem 108 provides the set of query filters for display on a user device and with content results that identify content in the set of resources in response to the first query (310). For example, the set of query filters may be displayed in a user interface such as the user interface 107a described with reference to FIG. 1. The user interface may be presented to users in response to a user-input query, in a web browser or other application that is capable of providing users with a query feature, e.g., in search results pages provided by a search engine that is accessible to users via a web browser. The user interface includes a query input, one or more user-selectable query filters, e.g., filters F1-F4, and a list of content results or search results, e.g., SR1-SRN. The query input may be a textual field if text queries are input, or may be a drop location if an image query is input, or may be any other input that supports a user interaction for a given input media. In some implementations, each content result in the list of content results is a search result that identifies a corresponding resource in the set of resources. In other implementations, each content result in the list of content results is a subset of content included in a resource in the set of resources.

The filter subsystem 108 receives a selection of one or more of the query filters from the user device (312). For example, the filter subsystem 108 may receive information identifying a selection of the filters F1 and F2, as described with reference to user interface 107b of FIG. 1.

The filter subsystem 108 provides a filtered set of content that identifies a set of content results that is different from an unfiltered set of content results for display on the user device (314). The filtered set of content that identifies a set of content results is a proper subset of the unfiltered set of content results. For example, as described with reference to FIG. 1, the filtered subsystem may determine that the query filters F1 and F2 have been selected, and in response to determining that the query filters F1 and F2 have been selected, may provide a different listing of content results SR1'-SRM'.

In other implementations, the user device 106 may filter results locally on the user device. For example, the user device may receive a set of N search results, e.g., N being 100, and display subsets of M search results, e.g., M being 10. When a user selects a particular filter, the N filters may be used to filter the N search results stored at the user device to modify the displayed search results.

Figure 4:
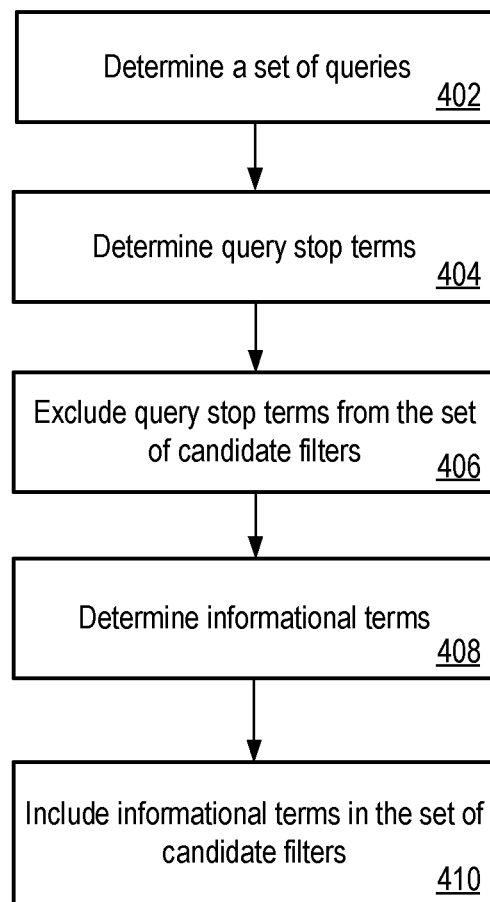
FIG. 4 is a flow diagram of an example process for determining a set of candidate filters from a set of keywords.

FIG. 4 is a flow diagram of an example process 400 for determining a set of candidate filters from a set of keywords. The process 400 can be implemented in a data processing apparatus that is used to realize the filter subsystem 108.

The filter subsystem 108 determines a set of queries from the resources in the set of resources that are determined to be responsive to a first search query (402). Each query in the set of queries is a query for which at least one of the resources has been selected by a user.

The filter subsystem 108 determines query stop terms from the set of queries (404). Each query stop term is a term in the set of queries having a frequency that meets a query stop term frequency threshold. In some implementations, the filter subsystem 108 may use a grammar learned from common, related, or specified queries to calculate a query stop term frequency for each of the set of queries. Each query that achieves or exceeds a predetermined query stop term threshold may be deemed useless for a query search in this domain and classified as a query stop term. For example, a user may input the query "find me cheese and guac burgers" and the filter subsystem may extract the keywords "Find me," "cheese," "and," "guac." The keywords "cheese" and "guac" may occur in other food-related searches, whereas the keywords "Find me" and "and," which do not identify any types of food, have a higher frequency of occurrence, e.g., in many cases unrelated to food searches. The filter subsystem could therefore determine that the keywords "Find me" and "and" are query stop terms.

The filter subsystem 108 excludes the query stop terms from the set of candidate filters (406). For example, continuing with the above example, the filter subsystem may exclude the terms "Find me" and "and" from the set of candidate filters.

The system determines informational terms from the set of queries (408). Each informational term is a term having a frequency in the set of queries that is less than or equal to an informational term threshold. Each query that does not achieve or exceed a predetermined informational term threshold may be considered useful for a query search in this domain and classified as an informational term. For example, continuing the example above, a user may input the query "find me cheese and guac burgers" and the filter subsystem may extract the keywords "Find me," "cheese," "and," "guac." The keywords "cheese" and "guac" may have a lower frequency of occurrence in other query searches than the keywords "Find me" and "and," which do not identify any types of food. The filter subsystem could therefore determine that the keywords "cheese" and "guac" are informational terms.

The system includes the informational terms in the set of candidate filters (410). For example, continuing with the above example, the filter subsystem may include the terms "cheese" and "guac" in the set of candidate filters.

The candidate filters found by the processes of FIGS. 3 and 4 may optionally be rated based on the frequency of the keywords in the keyword corpus 210, and based on term prominence in the resources, and on other criteria. For example, the term "Guacamole" may appear often in the corpus and in title sections. However, the term "beef," while also appearing often, may only appear in body sections subordinate to the titles. Thus the term "Guacamole" may be rated higher as a candidate filter than the term "beef."

Figure 5:
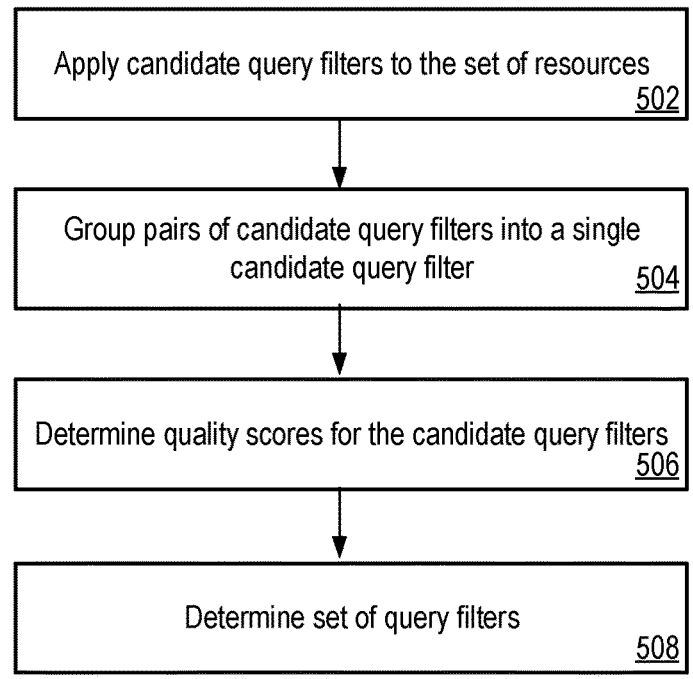
FIG. 5 is a flow diagram of an example process for determining a set of query filters from a set of candidate filters.

FIG. 5 is a flow diagram of an example process 500 for determining a set of query filters from a set of candidate filters. The process 500 can be implemented in a data processing apparatus that is used to realize the filter subsystem 108.

For each candidate query filter in the set of candidate filters, the filter subsystem applies the candidate query filter to the set of resources to obtain a corresponding filtered set of content results (502). For example, the set of candidate filters may include the candidate query filters "guacamole" and "guac," and the filter subsystem may apply both the candidate query filter "guacamole" and the candidate query filter "guac" to obtain two corresponding filtered sets of content results.

The filter subsystem groups a pair of candidate query filters for which respective filtered sets of content results meet a similarity threshold that is indicative of the respective filtered sets of content results being substantially similar (504). For example, the filter subsystem may determine that the filtered set of content results resulting from applying the query filter "guacamole" meets or exceeds a similarity threshold to the filtered set of content results resulting from applying the query filter "guac." The filter subsystem may therefore group the candidate query filters "guacamole" and "guac." In some implementations, the filter subsystem may select a representative candidate query filter for the group of candidate query filters.

The filter subsystem determines quality scores for the candidate query filters based on the locations of the candidate query filters in the resources (506). For example, a candidate query filter that appears in a prominent position of a resource, such as in the title of a resource, may be assigned a higher quality score than a different candidate query filter that appears in meta data associated with the resource.

The filter subsystem determines a set of query filters from the set of candidate filters (508). The set of query filters are selected from the set of candidate filters based on the query filter's determined quality scores and diversity. As described above with reference to step 308 of FIG. 3, each query filter in the set of query filters meets the diversity threshold when respective filtered sets of content resulting from applying a respective query filter to the set of resources are sufficiently different from each other. Again, the set of candidate filters may include the keywords "guacamole" and "guac." The system may determine that the set of content resulting from applying the query filter "guacamole" to the set of resources for the search query "burgers" may be similar, if not identical, to the set of content resulting from applying the query filter "guac" to the set of resources for the search query "burgers". Thus, only one of the keywords "guacamole" and "guac" would be selected.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method, comprising:
  receiving, for a first query, data identifying a set of resources that are determined to be responsive to the first query;
  extracting, from the set of resources, a first set of keywords from the contents of the resources that have been identified as responsive to the first query;

determining, from the first set of keywords, a set of candidate filters from the keywords, each candidate filter derived from one or more keywords in the set of keywords, and wherein the set of candidate filters are a proper subset of the first set of keywords, the determining comprising:
  determining, from the set of resources, query stop terms, each query stop term being a term having a frequency in a set of queries that satisfies a query stop term frequency threshold;
  excluding, from the set of candidate filters, the query stop terms in the first set of keywords;
  determining, from the set of resources, informational terms, each informational term being a term having a frequency in the set of queries that satisfies an informational term frequency threshold; and
  including, in the set of candidate filters, the informational terms in the first set of keywords;
determining, from the set of candidate filters, a set of query filters for the first query;
providing, in response to the first query, for display on a user device and with content results that identify content in the set of resources, the set of query filters for the first query;
receiving a selection of a particular query filter of the set of query filters for the first query; and
in response to receiving the selection of the particular query filter of the set of query filters, providing, for display on the user device, a filtered set of content that identifies a set of content results for the particular query filter that is different than an unfiltered set of content results, and that is a proper subset of the unfiltered set of content results.

2. The computer-implemented method of claim 1, wherein each content result is a search result that identifies a corresponding resource in the set of resources.

3. The computer-implemented method of claim 1, wherein each content result is a subset of content included in a resource in the set of resources.

4. The method of claim 1, wherein determining, from the first set of keywords, the set of candidate filters from the keywords comprises:
  determining, from the resources in the set of resources, the set of queries, each query in the set of queries being a query for which at least one of the resources has been selected by a user in response to the query.

5. The method of claim 1, wherein determining, from the first set of keywords, the set of candidate filters from the keywords comprises:
  determining, from the first query, the set of queries, each query in the set of queries being a query that is determined to be related to the first query.

6. The method of claim 1, wherein determining, from the set of candidate filters, the set of query filters for the first query further comprises:
  determining a quality score for each candidate filter based on locations of the candidate filter in the resources.

7. The method of claim 1, wherein the informational term frequency threshold is a maximum threshold.

8. A system, comprising:
a data processing apparatus; and
a non-transitory computer readable medium storing instructions executable by the data processing apparatus and that upon such execution cause the data processing apparatus to perform operations comprising:
  receiving, for a first query, data identifying a set of resources that are determined to be responsive to the first query;
  extracting, from the set of resources, a first set of keywords from the contents of the resources that have been identified as responsive to the first query;
  determining, from the first set of keywords, a set of candidate filters from the keywords, each candidate filter derived from one or more keywords in the set of keywords, and wherein the set of candidate filters are a proper subset of the first set of keywords, the determining comprising:
    determining, from the set of resources, query stop terms, each query stop term being a term having a frequency in a set of queries that satisfies a query stop term frequency threshold;
    excluding, from the set of candidate filters, the query stop terms in the first set of keywords;
    determining, from the set of resources, informational terms, each informational term being a term having a frequency in the set of queries that satisfies an informational term frequency threshold; and
    including, in the set of candidate filters, the informational terms in the first set of keywords;
  determining, from the set of candidate filters, a set of query filters for the first query;
  providing, in response to the first query, for display on a user device and with content results that identify content in the set of resources, the set of query filters for the first query;
  receiving a selection of a particular query filter of the set of query filters for the first query; and
  in response to receiving the selection of the particular query filter of the set of query filters, providing, for display on the user device, a filtered set of content that identifies a set of content results for the particular query filter that is different than an unfiltered set of content results, and that is a proper subset of the unfiltered set of content results.

9. The system of claim 8, wherein each content result is a search result that identifies a corresponding resource in the set of resources.

10. The system of claim 8, wherein each content result is a subset of content included in a resource in the set of resources.

11. The system of claim 8, wherein determining, from the first set of keywords, the set of candidate filters from the keywords comprises:
  determining, from the resources in the set of resources, the set of queries, each query in the set of queries being a query for which at least one of the resources has been selected by a user in response to the query.

12. The system of claim 8, wherein determining, from the first set of keywords, the set of candidate filters from the keywords comprises:
  determining, from the first query, the set of queries, each query in the set of queries being a query that is determined to be related to the first query.

13. The system of claim 8, wherein determining, from the set of candidate filters, the set of query filters for the first query further comprises:
  determining a quality score for each candidate filter based on locations of the candidate filter in the resources.

14. The system of claim 8, wherein the informational term frequency threshold is a maximum threshold.

15. A non-transitory computer readable medium storing instructions executable by a data processing apparatus and that upon such execution cause the data processing apparatus to perform operations comprising:

receiving, for a first query, data identifying a set of resources that are determined to be responsive to the first query;

extracting, from the set of resources, a first set of keywords from the contents of the resources that have been identified as responsive to the first query;

determining, from the first set of keywords, a set of candidate filters from the keywords, each candidate filter derived from one or more keywords in the set of keywords, and wherein the set of candidate filters are a proper subset of the first set of keywords, the determining comprising:

determining, from the set of resources, query stop terms, each query stop term being a term having a frequency in a set of queries that satisfies a query stop term frequency threshold;

excluding, from the set of candidate filters, the query stop terms in the first set of keywords;

determining, from the set of resources, informational terms, each informational term being a term having a frequency in the set of queries that satisfies an informational term frequency threshold; and including, in the set of candidate filters, the informational terms in the first set of keywords;

determining, from the set of candidate filters, a set of query filters for the first query;

providing, in response to the first query, for display on a user device and with content results that identify content in the set of resources, the set of query filters for the first query;

receiving a selection of a particular query filter of the set of query filters for the first query; and in response to receiving the selection of the particular query filter of the set of query filters, providing, for display on the user device, a filtered set of content that identifies a set of content results for the particular query filter that is different than an unfiltered set of content results, and that is a proper subset of the unfiltered set of content results.

16. The non-transitory computer readable medium of claim 15, wherein each content result is a search result that identifies a corresponding resource in the set of resources.

17. The non-transitory computer readable medium of claim 15, wherein each content result is a subset of content included in a resource in the set of resources.

18. The non-transitory computer readable medium of claim 15, wherein determining, from the first set of keywords, the set of candidate filters from the keywords comprises:

determining, from the resources in the set of resources, the set of queries, each query in the set of queries being a query for which at least one of the resources has been selected by a user in response to the query.

19. The non-transitory computer readable medium of claim 15, wherein determining, from the first set of keywords, the set of candidate filters from the keywords comprises:

determining, from the first query, the set of queries, each query in the set of queries being a query that is determined to be related to the first query.

20. The non-transitory computer readable medium of claim 15, wherein determining, from the set of candidate filters, the set of query filters for the first query further comprises:

determining a quality score for each candidate filter based on locations of the candidate filter in the resources.

* * * * *